Patented Aug. 17, 1943

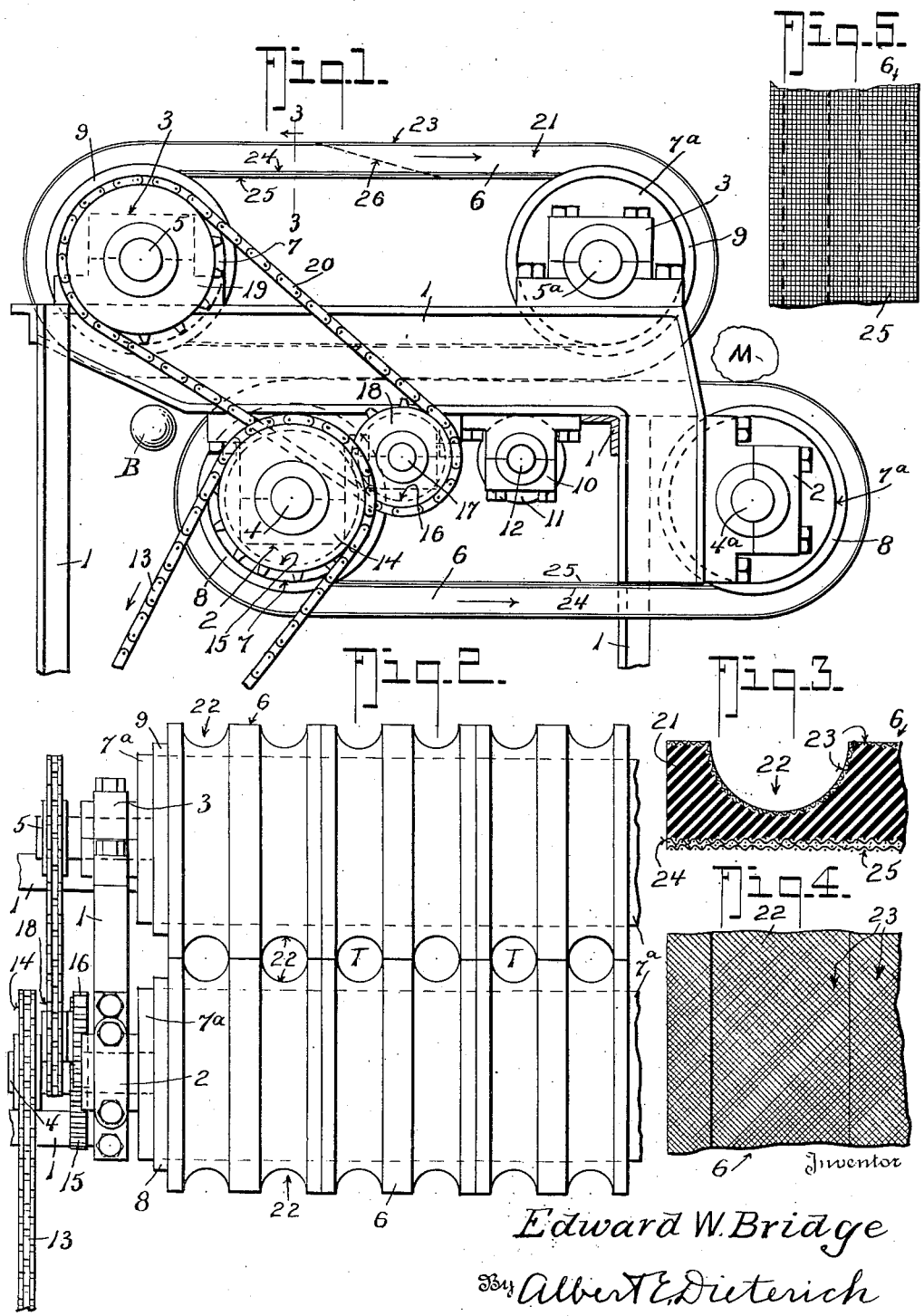

2,327,245

UNITED STATES PATENT OFFICE 2,327,245

MASS BALLING MACHINE AND BELT

Edward W. Bridge, Philadelphia, Pa.

Application July 25, 1942, Serial No. 452,340

3 Claims. (Cl. 107—11)

My invention relates to machines for forming plastic masses into balls and it especially has for its object to provide a machine which employs new and improved belts defining between them a tunnel for receiving plastic slugs from die-expressing machines and rolling the slugs (of any desired shape) into globular masses or balls.

A further object is to provide a mass balling machine that is particularly adapted for use with candy depositing machines, such as are described in my Patent No. 2,252,248, issued August 12, 1941.

Generally, the present invention relates to machines of the type wherein the gobs of candy are rolled between upper and lower tunnel members, such as those described in my Patent No. 2,293,109 dated August 18, 1942.

Again, it is an object of the invention to eliminate the necessity of using mould boards in the channels of which thin flexible belts, heretofore employed, must slide.

Further, it is an object to provide tunnel forming belts of such improved structure that they may be used alone and the friction of the belts over stationary surfaces, such as mould boards, may be avoided.

Again, it is an object to provide a belt which will not slip on its supporting and driving rolls and the masses to be balled will roll over and over, instead of slipping on smooth, wet and oily rubber surfaces.

Other objects will in part be obvious and in part will be pointed out hereinafter.

To the attainment of the aforesaid objects and ends the invention still further resides in the novel details of construction, combination and arrangement of parts, all of which will be first fully described in the following detailed description, and then be particularly pointed out in the appended claims, reference being had to the accompanying drawing, in which:

Fig. 1 illustrates in side elevation a machine embodying the present invention, parts being broken away and a part of the frame being shown in section.

Fig. 2 is an end elevation of a portion of the structure shown in Fig. 1, looking from right to left in that figure.

Fig. 3 is an enlarged detail cross section on the line 3—3 of Fig. 1.

Fig. 4 is a plan view of the detail shown in Fig. 3.

Fig. 5 is an inverted plan view of the detail shown in Fig. 4 but on a smaller scale.

In the drawing, in which like numerals and letters of reference indicate like parts in all the figures, 1 designates a suitable framework on which is mounted a pair of bearings 2—2 for the shafts 4—4ª of the pulleys or rollers 7—7ª, around which the lower belt 6 passes. A second set of bearings 3—3 is mounted on the framework 1 for the shafts 5—5ª of the pulleys or rollers 7—7ª, around which the upper belt 6 passes. The lower pulleys 7—7ª are provided with side flanges 8, while the upper pulleys or rollers 7—7ª have flanges 9 at the sides.

Mounted on the framework 1 are bearings 10 for the shaft 12 of an idler roller 11 which supports the working flight (upper flight) of the lower belt 6 midway between the end rollers 7—7ª. The working flight (lower flight) of the upper belt 6 parallels, and is in close proximity to, the working flight of the lower belt.

Any suitable means may be provided for driving the belts. For convenience of illustration I have shown a driving sprocket chain 13 which takes around a sprocket 14 on the shaft 4. The shaft 4 also carries a spur gear 15 which meshes with a gear 16 on a stub shaft 17 mounted on an extension of the bearing 2 which carries one end of the shaft 4. The shaft 17 also carries a sprocket 18 which turns with the gear 16 as one. The shaft 5 of the upper belt pulley 7 carries a sprocket 19 around which, and around the sprocket 18, a drive chain 20 passes.

Each belt 6 is of the same construction and each comprises a body 21 of rubber (natural or synthetic) of a sufficient thickness to serve its intended purpose. The face of the body 21 which rides on the pulleys is provided with one or more layers 24, 25 of fabric—preferably of a relatively heavy nature—while the working face of the belt is covered, preferably, by a single thin layer of fabric 23. The layers of fabric 23, 24, 25 are moulded into the body 21 during the process of manufacture of the belt so as to become integral therewith. The threads of the fabric 23 are preferably arranged as in Fig. 4 to lie at an angle of about 45° to the direction of travel of the belt. Each fabric layer 24, 25, however, is preferably laid with its warp threads running lengthwise of the belt so that the face of the belt that engages the pulleys or rollers 7—7ª will be substantially non-stretchable.

The working face of the belt is provided with one or more semi-cylindrical grooves 22. The belt is preferably made in units each having two grooves, as best shown in Fig. 2 of the drawing. The grooves 22 of the upper and lower belts form between them tunnels T, through which tunnels the masses M are passed and rolled into balls B. As clearly shown in Fig. 3, the depth of the groove 22 is at least equal to the radius of the groove, or in other words the wall or face of the groove in cross-section is 180 degrees in extent; this provides sharp edges where the wall of the groove meets the flat surface of the outside of the belt.

The shafts 4 and 5 and 4ª and 5ª, respectively, are offset with respect to one another, as shown in Fig. 1, so that the masses M may be deposited on the lower belt before reaching the upper belt, and so that the balls B are discharged conveniently beneath the projecting portion of the upper belt (see Fig. 1).

In manufacturing the belts 6, the belts are preferably extruded through dies to give them the proper cross sectional form. They are then cut into suitable lengths to form belts of the required dimensions. The ends of the sections are bevel-cut, as indicated in dotted lines 26 in Fig. 1, and when the material of the belt is vulcanized the overlapping bevelled ends are united into an integral structure. This bevelled joint gives the required strength to prevent separation of the belt at the joint when the belt is placed under tension.

In the embodiment of the invention illustrated in Fig. 1, it will be seen that the working flights of the belt 6 move in the same direction, but the lineal speed of the upper belt is less than that of the lower belt, this being brought about through the reduction gearing between the shafts 4 and 5.

While the embodiment of the invention illustrated in Fig. 1 shows the upper and lower belts running in opposite directions (the working flights running the same direction, however) it is obvious that suitable gearing may be provided by means of which the upper belt 6 may be run with its working flight travelling at a slower speed in a direction opposite to that of the working flight of the lower belt, but as that is a mere mechanical change which is obvious to anyone skilled in the art, illustration thereof is not thought to be necessary here.

By laying the fabric 23 with the threads running on the bias, as indicated in Fig. 4, the fabric may undergo stretching in the length of the belt as the belt goes around the end rollers or pulleys without deforming the cross sectional dimensions of the belt, where the upper and lower belts run together.

From the foregoing description, taken with the accompanying drawing, it is thought that the construction, operation and advantages of the invention will be clear to those skilled in the art to which it relates.

What I claim is:

1. As a new article of manufacture; an endless mass-balling machine belt comprising an endless flexible body of rubber-like material having its inner face straight across and having its outer face provided with at least one longitudinal groove of semi-circular cross section, the depth of the groove being at least equal to its radius of curvature, there being sharp longitudinal edges provided where the curve of the groove meets the un-curved outer surface of the body.

2. As a new article of manufacture; the belt constructed as described in claim 1 wherein there is at least one layer of straight-laid fabric integral with the inner face of the body at least one layer of bias-laid fabric integral with the outer face of the body and the face of the groove.

3. As a new article of manufacture; a belt constructed as described in claim 1 wherein there is at least one layer of bias-laid exposed fabric integral with the outer face of the body and its groove, and at least one layer of straight-laid fabric on the inner face of the body.

EDWARD W. BRIDGE.